(12) United States Patent
Park et al.

(10) Patent No.: US 10,905,986 B2
(45) Date of Patent: Feb. 2, 2021

(54) WATER TREATMENT APPARATUS

(71) Applicant: COWAY CO., LTD., Chungcheongnam-do (KR)

(72) Inventors: Sun-Hyeok Park, Seoul (KR); Jung-Hwan Lee, Seoul (KR); Jong-Hwan Lee, Seoul (KR); Woo-Jin Joo, Seoul (KR); Hyun-Soo Shin, Seoul (KR); Kyung-Heon Lee, Seoul (KR); Byoung-Hoon Lim, Seoul (KR); Sung-Kon Cho, Seoul (KR)

(73) Assignee: Coway Co., Ltd

( * ) Notice: Subject to any disclaimer, the term of this patent is extended or adjusted under 35 U.S.C. 154(b) by 314 days.

(21) Appl. No.: 15/745,384

(22) PCT Filed: Jul. 5, 2016

(86) PCT No.: PCT/KR2016/007245
§ 371 (c)(1),
(2) Date: Jan. 16, 2018

(87) PCT Pub. No.: WO2017/010723
PCT Pub. Date: Jan. 19, 2017

(65) Prior Publication Data
US 2019/0111365 A1  Apr. 18, 2019

(30) Foreign Application Priority Data

Jul. 15, 2015  (KR) .......................... 10-2015-0100550
Oct. 7, 2015   (KR) .......................... 10-2015-0140839

(51) Int. Cl.
*B01D 35/00*  (2006.01)
*B01D 35/157* (2006.01)
(Continued)

(52) U.S. Cl.
CPC ......... *B01D 35/16* (2013.01); *B01D 35/1573* (2013.01); *B01D 61/04* (2013.01);
(Continued)

(58) Field of Classification Search
CPC .... B01D 35/00; B01D 35/1573; B01D 35/16; B01D 61/025; B01D 61/04; B01D 61/10;
(Continued)

(56) References Cited

U.S. PATENT DOCUMENTS

2013/0062219 A1* 3/2013 Lee .......................... C02F 9/005
                                                         205/742

FOREIGN PATENT DOCUMENTS

JP      2001-070931      3/2001
KR   1020110127595      11/2011
(Continued)

OTHER PUBLICATIONS

[Good World 25 o'clock] Blog, May 19, 2014, Internet: <URL: blog.daum.net/vvv2757/556>, pp. 8.
(Continued)

Primary Examiner — Lucas A Stelling
(74) Attorney, Agent, or Firm — The Farrell Law Firm, P.C.

(57) ABSTRACT

A water treatment apparatus is provided. The water treatment apparatus includes a filtering unit including a water filter filtering raw water, a sterilizing water generator producing sterilizing water from purified water filtered by at least a portion of the filtering unit, and a discharge member through which the purified water, filtered by the filtering unit, is discharged externally. The sterilizing water produced in the sterilizing water generator sterilizes the discharge member and at least a portion of a flow path connected to the discharge member.

31 Claims, 13 Drawing Sheets

(51) Int. Cl.
*B01D 35/16* (2006.01)
*B01D 61/02* (2006.01)
*B01D 61/04* (2006.01)
*B01D 61/10* (2006.01)
*B01D 65/02* (2006.01)
*C02F 1/28* (2006.01)
*C02F 1/44* (2006.01)
*C02F 1/00* (2006.01)

(52) U.S. Cl.
CPC ............ *B01D 65/027* (2013.01); *C02F 1/001* (2013.01); *C02F 1/44* (2013.01); *B01D 61/025* (2013.01); *B01D 61/10* (2013.01); *B01D 2201/165* (2013.01); *B01D 2311/04* (2013.01); *B01D 2311/06* (2013.01); *B01D 2311/2626* (2013.01); *B01D 2311/2649* (2013.01); *B01D 2311/2692* (2013.01); *B01D 2313/12* (2013.01); *B01D 2313/18* (2013.01); *B01D 2313/22* (2013.01); *B01D 2321/20* (2013.01); *C02F 1/283* (2013.01); *C02F 1/441* (2013.01); *C02F 1/444* (2013.01); *C02F 2303/04* (2013.01); *C02F 2307/10* (2013.01)

(58) Field of Classification Search
CPC ............ B01D 65/027; B01D 2201/165; B01D 2311/04; B01D 2311/06; B01D 2311/2626; B01D 2311/2649; B01D 2311/2692; B01D 2313/12; B01D 2313/18; B01D 2313/22; B01D 2321/20; C02F 1/001; C02F 1/283; C02F 1/44; C02F 1/441; C02F 1/444; C02F 1/46; C02F 1/461; C02F 1/467; C02F 1/4672; C02F 1/4674; C02F 1/50; C02F 1/76; C02F 9/00
See application file for complete search history.

(56) References Cited

FOREIGN PATENT DOCUMENTS

| | | |
|---|---|---|
| KR | 1020120047141 | 5/2012 |
| KR | 1020120135783 | 12/2012 |
| KR | 1020130069973 | 6/2013 |
| KR | 1020130104089 | 9/2013 |
| KR | 1020140022937 | 2/2014 |
| KR | 1020140081431 | 7/2014 |
| KR | 1020140081629 | 7/2014 |
| KR | 1020140086600 | 7/2014 |

OTHER PUBLICATIONS

PCT/ISA/210 Search Report issued on PCT/KR2016/007245 pp. 7.
PCT/ISA/237 Written Opinion issued on PCT/KR2016/007245 pp. 5.

* cited by examiner

[Figure 1]
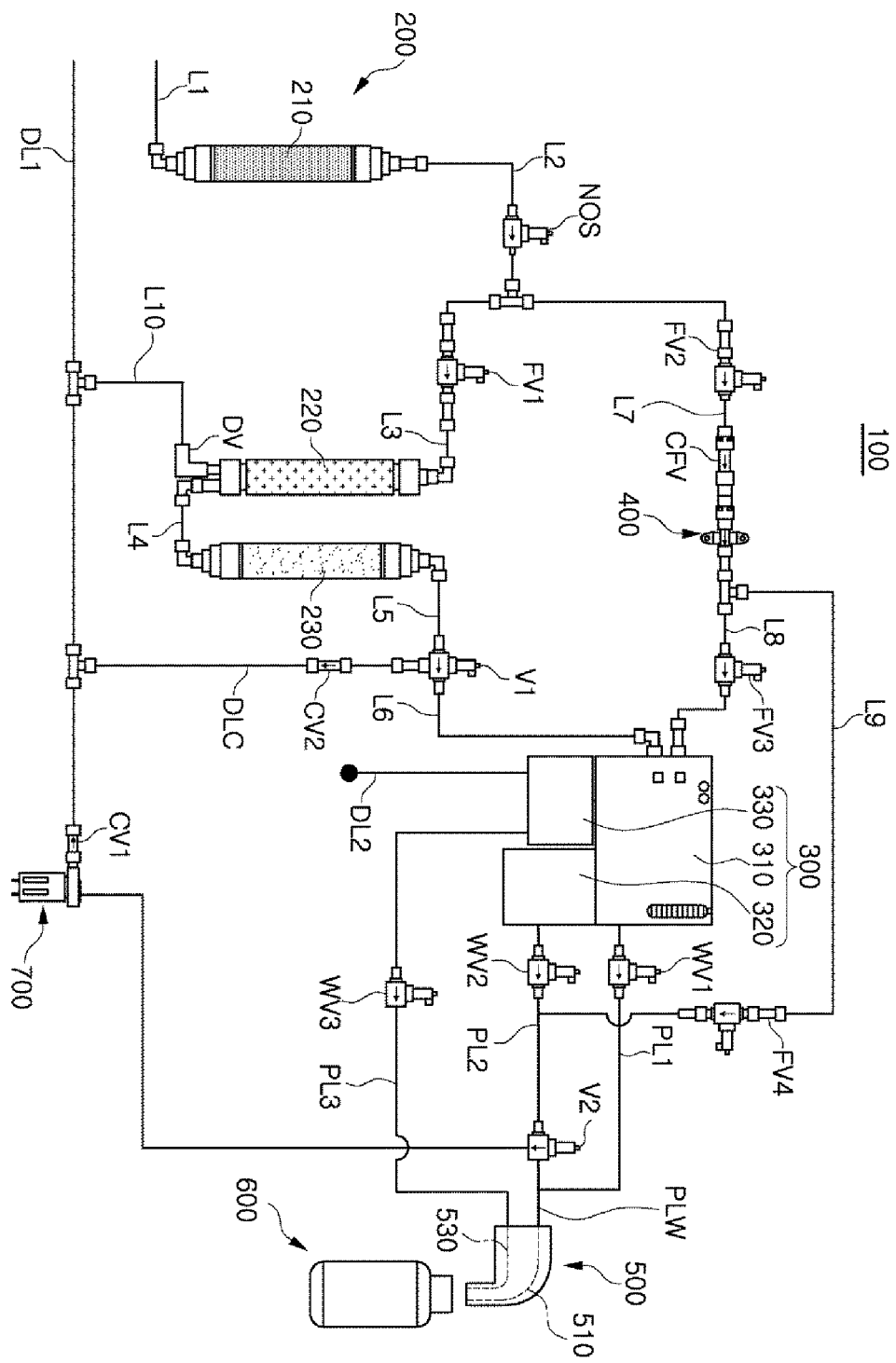

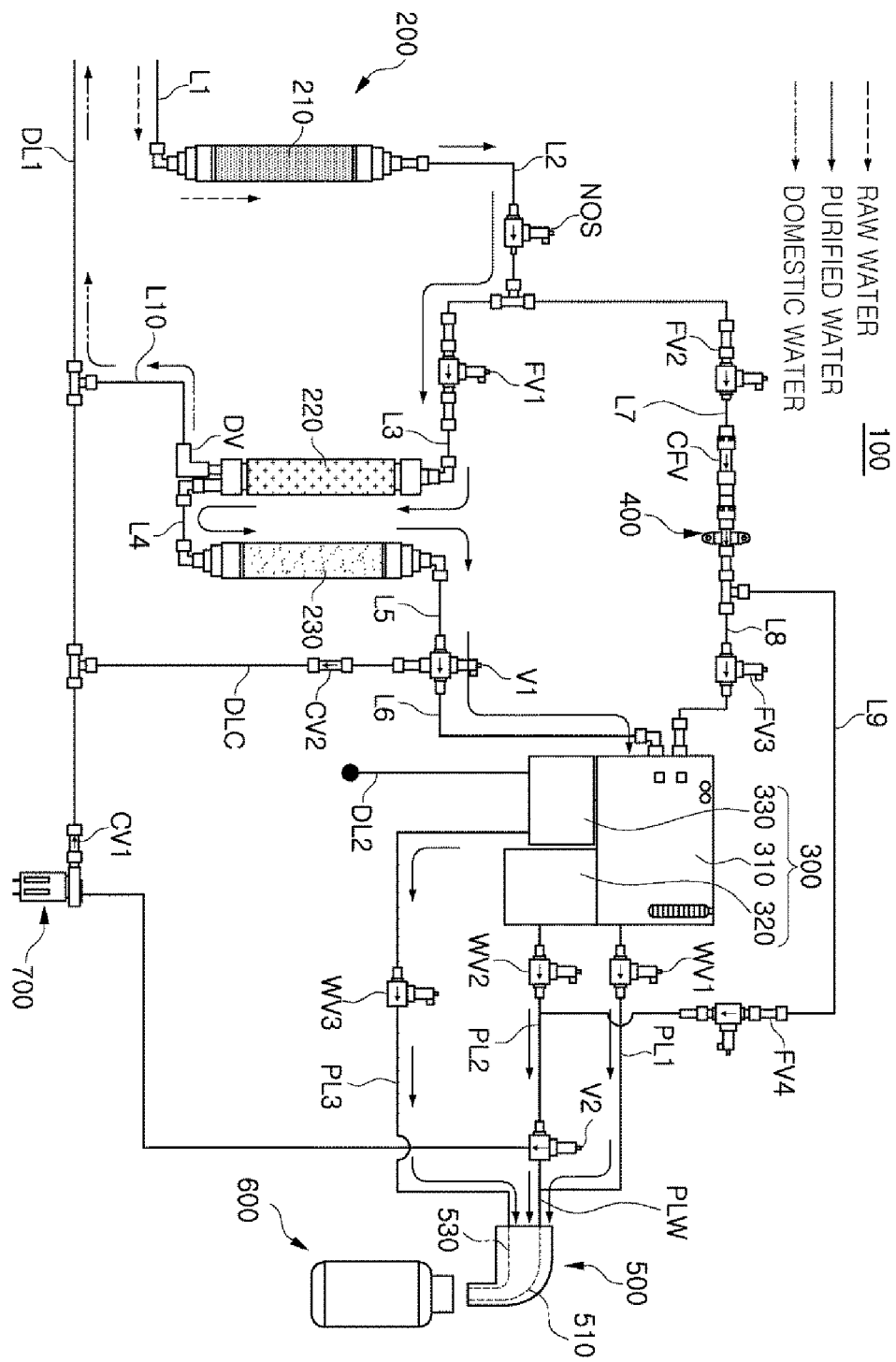
[Figure 2]

[Figure 3]
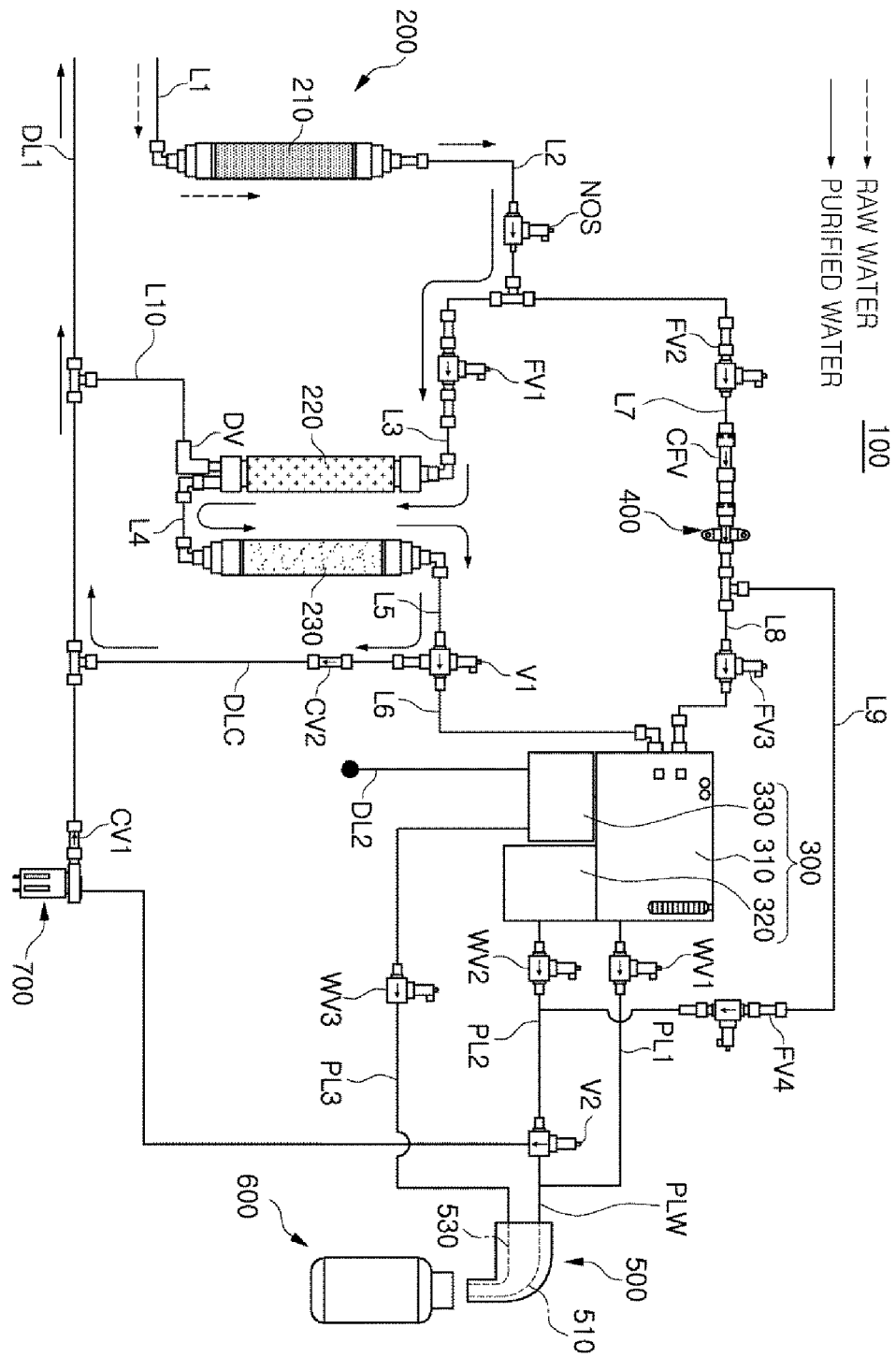

[Figure 4]
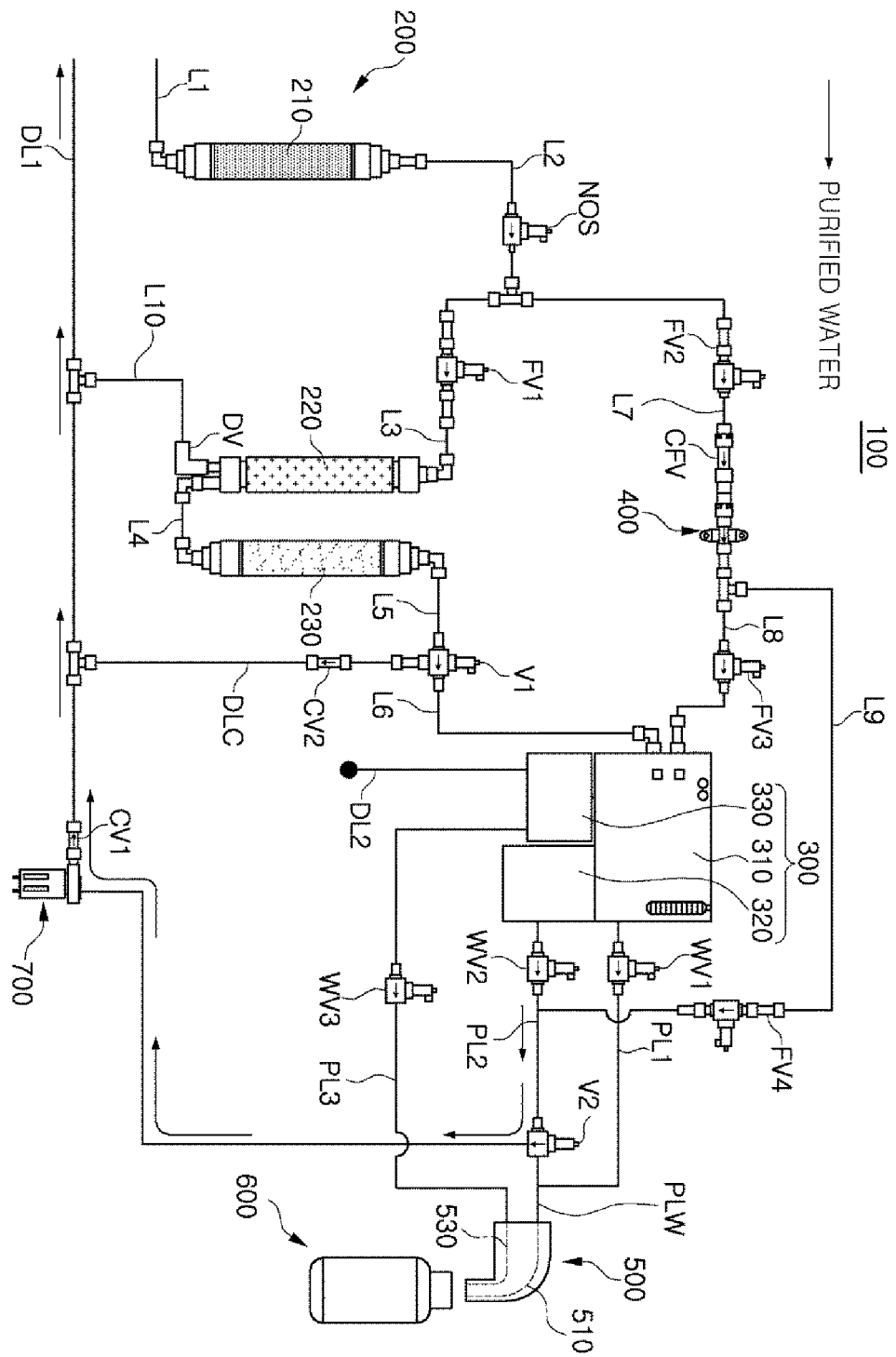

[Figure 5]
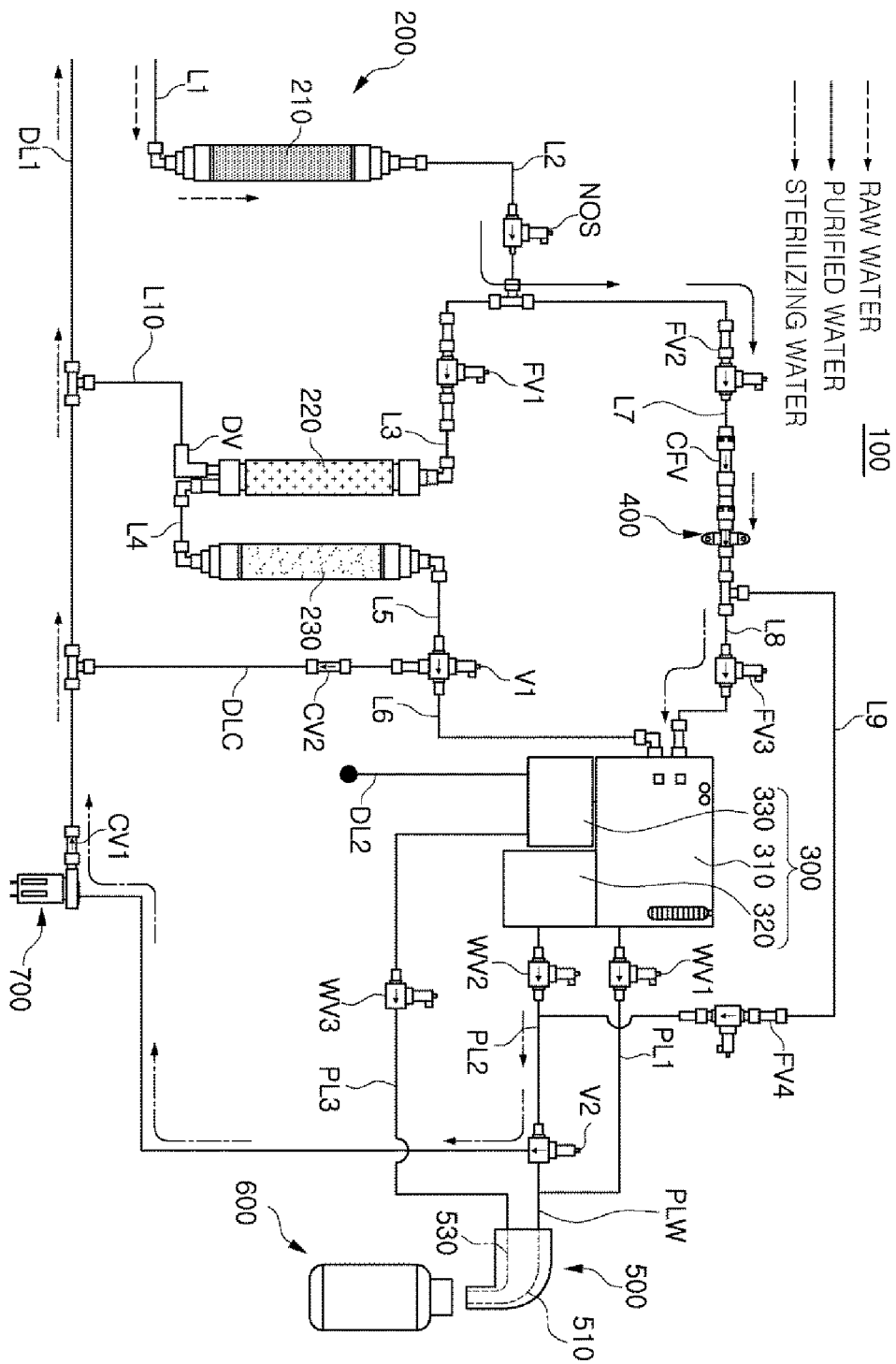

[Figure 6]
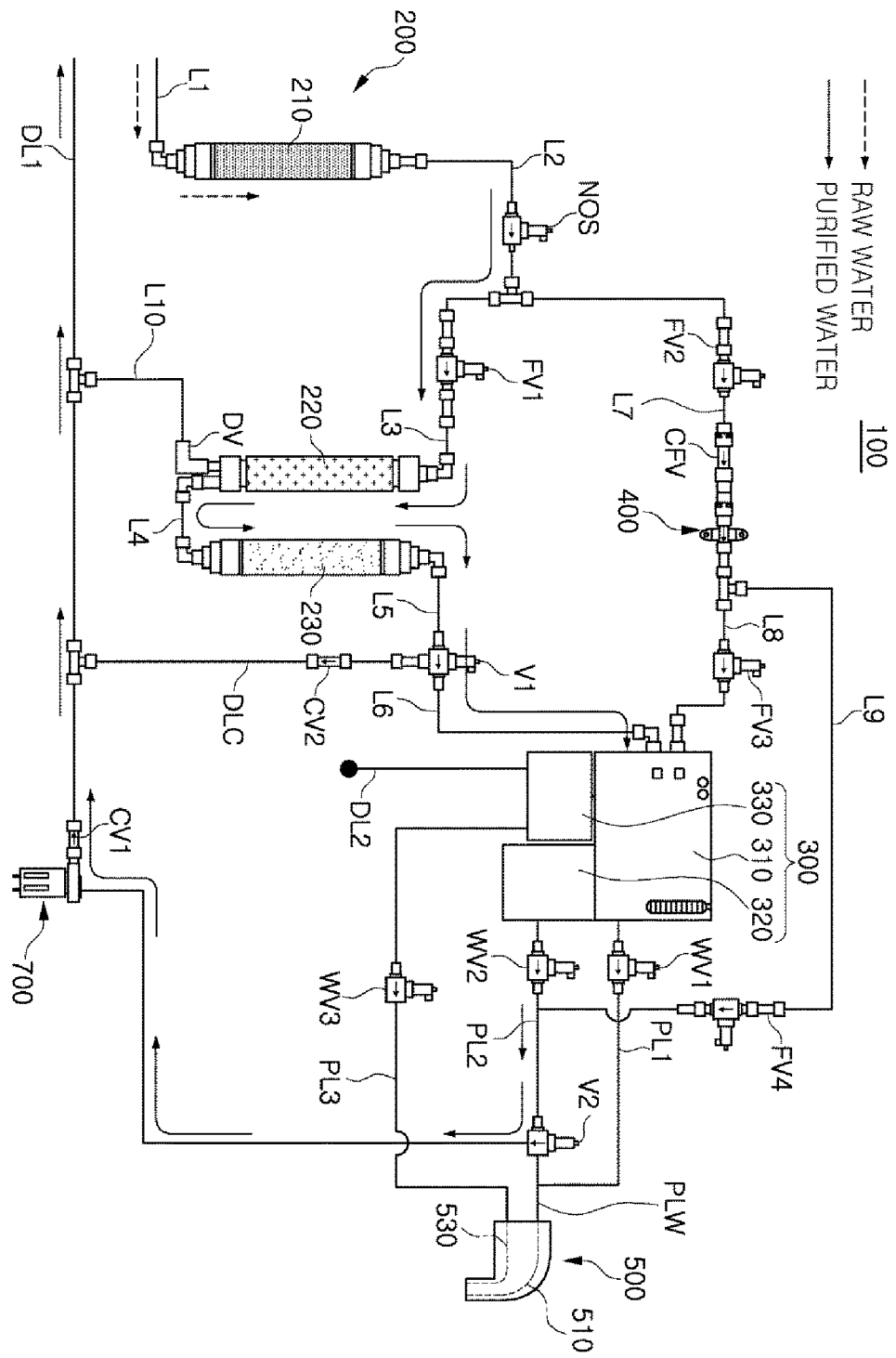

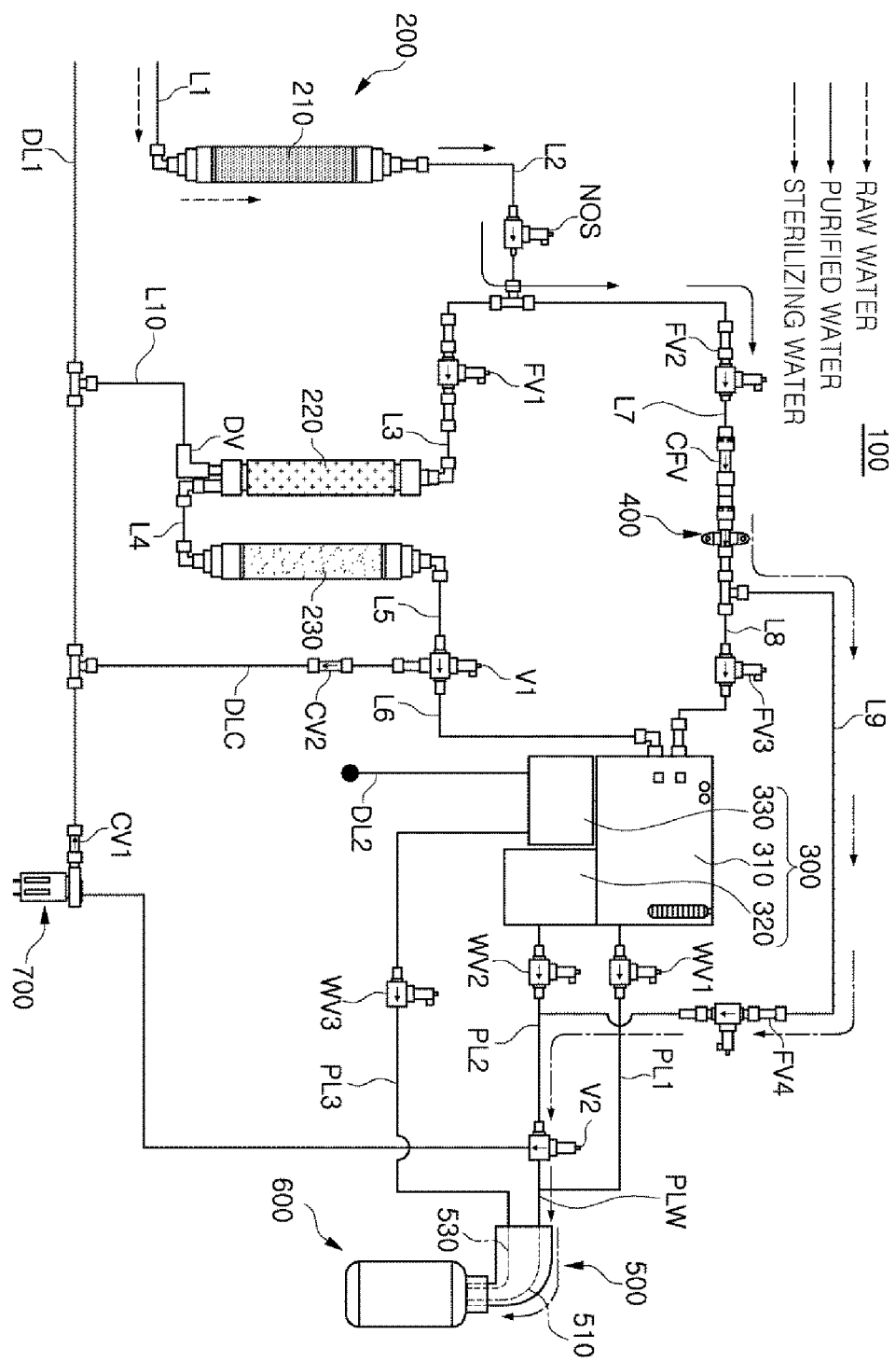
[Figure 7]

[Figure 8]
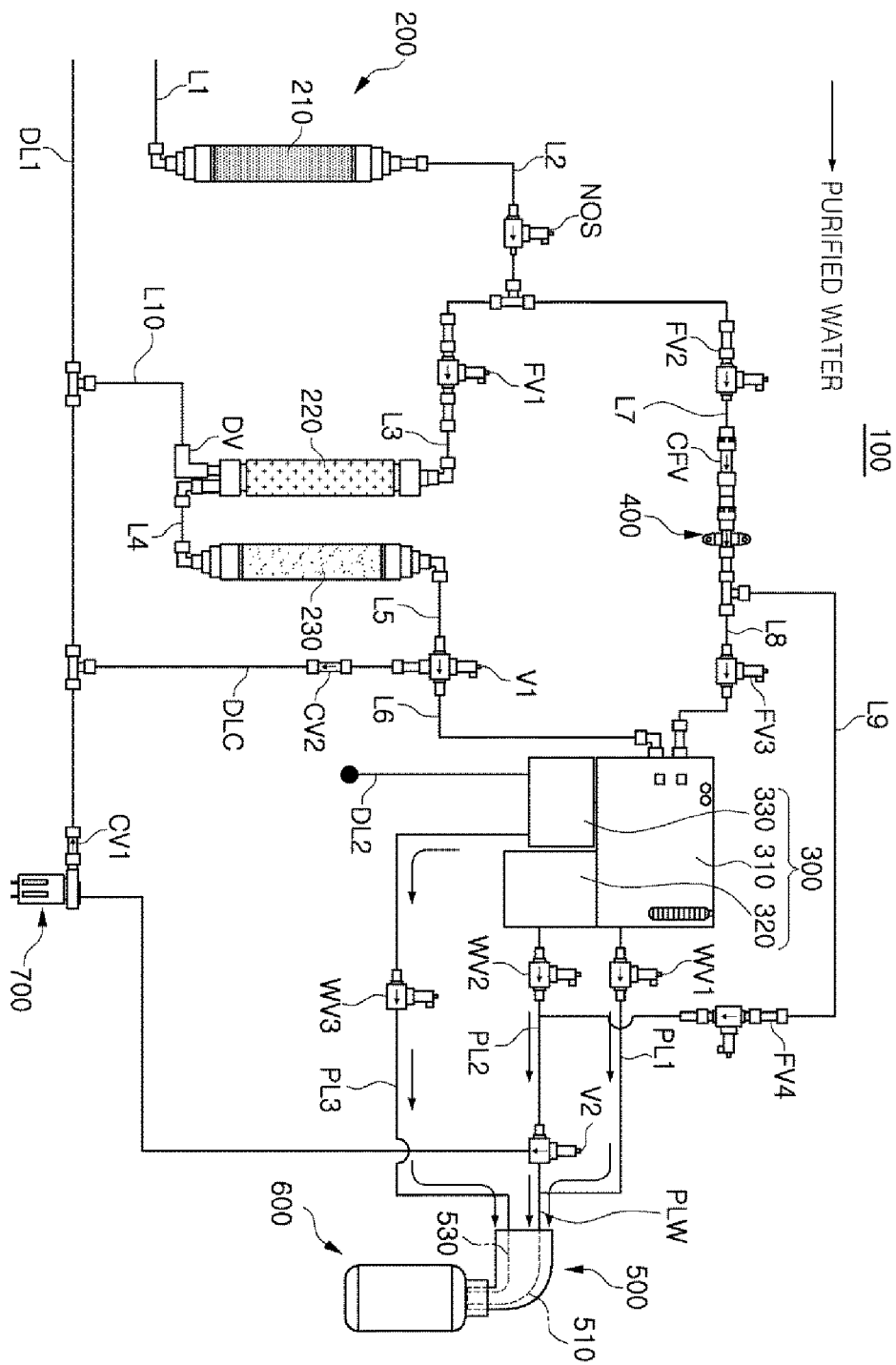

[Figure 9]
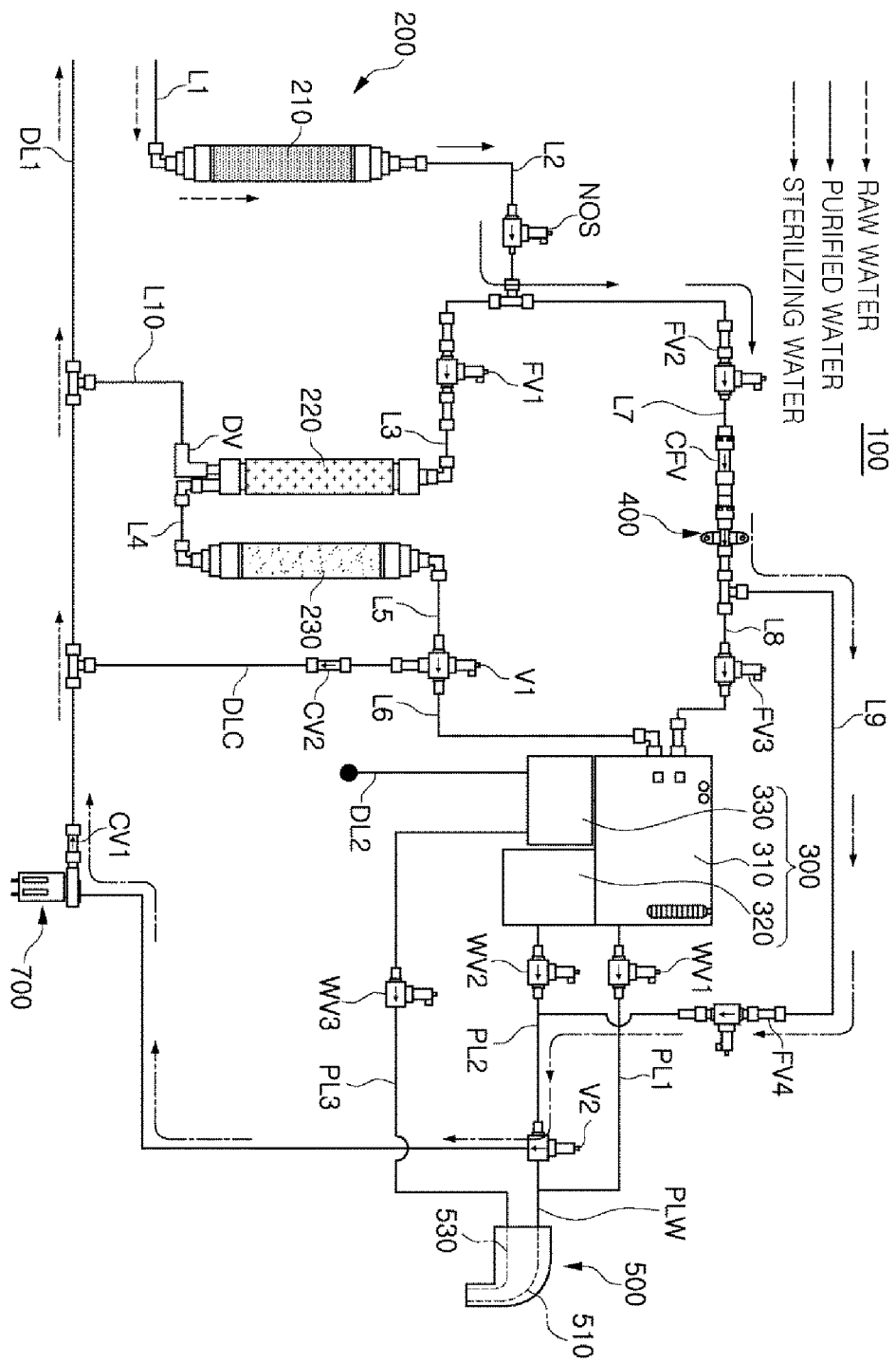

[Figure 10]
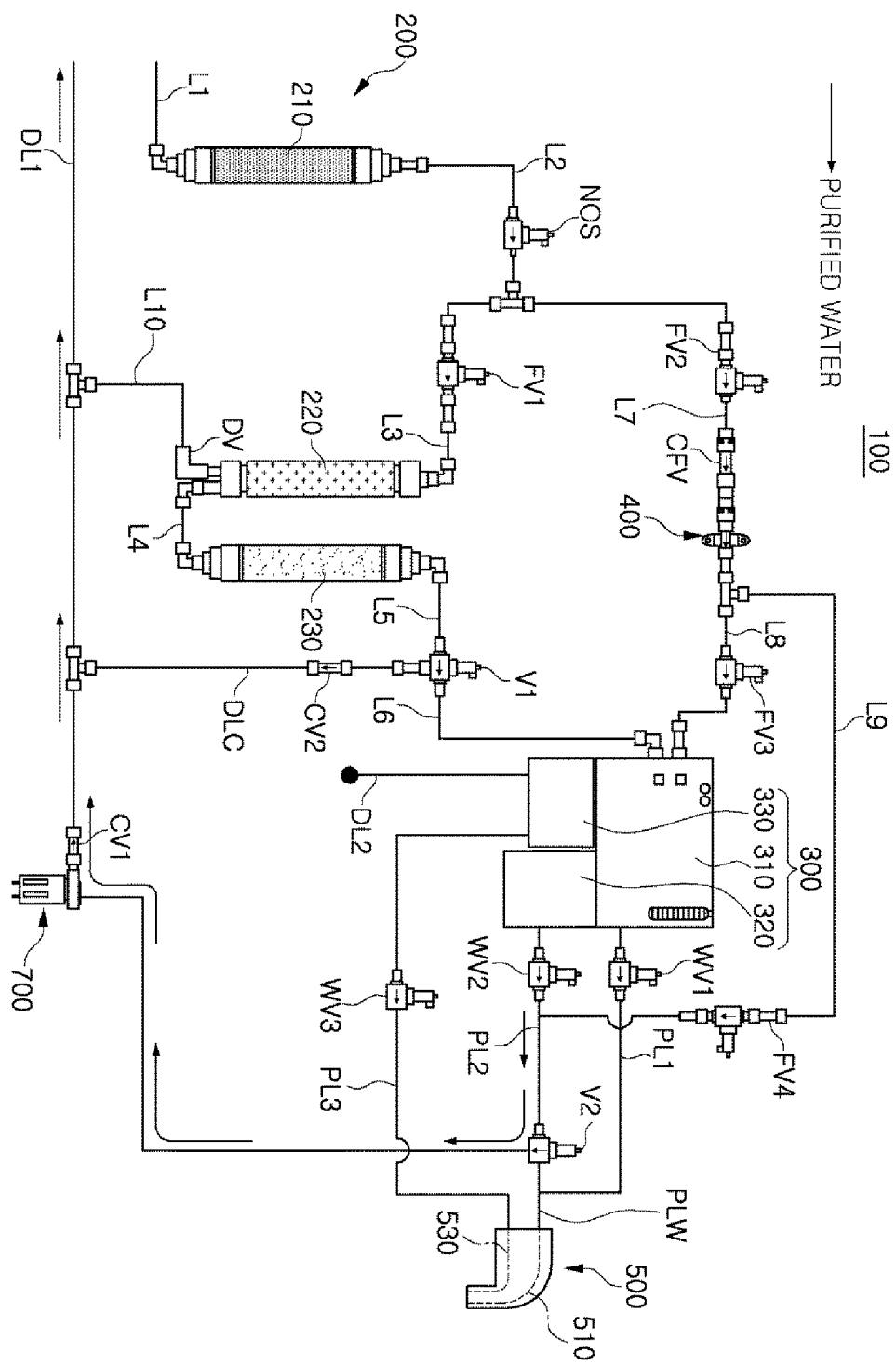

【Figure 11】
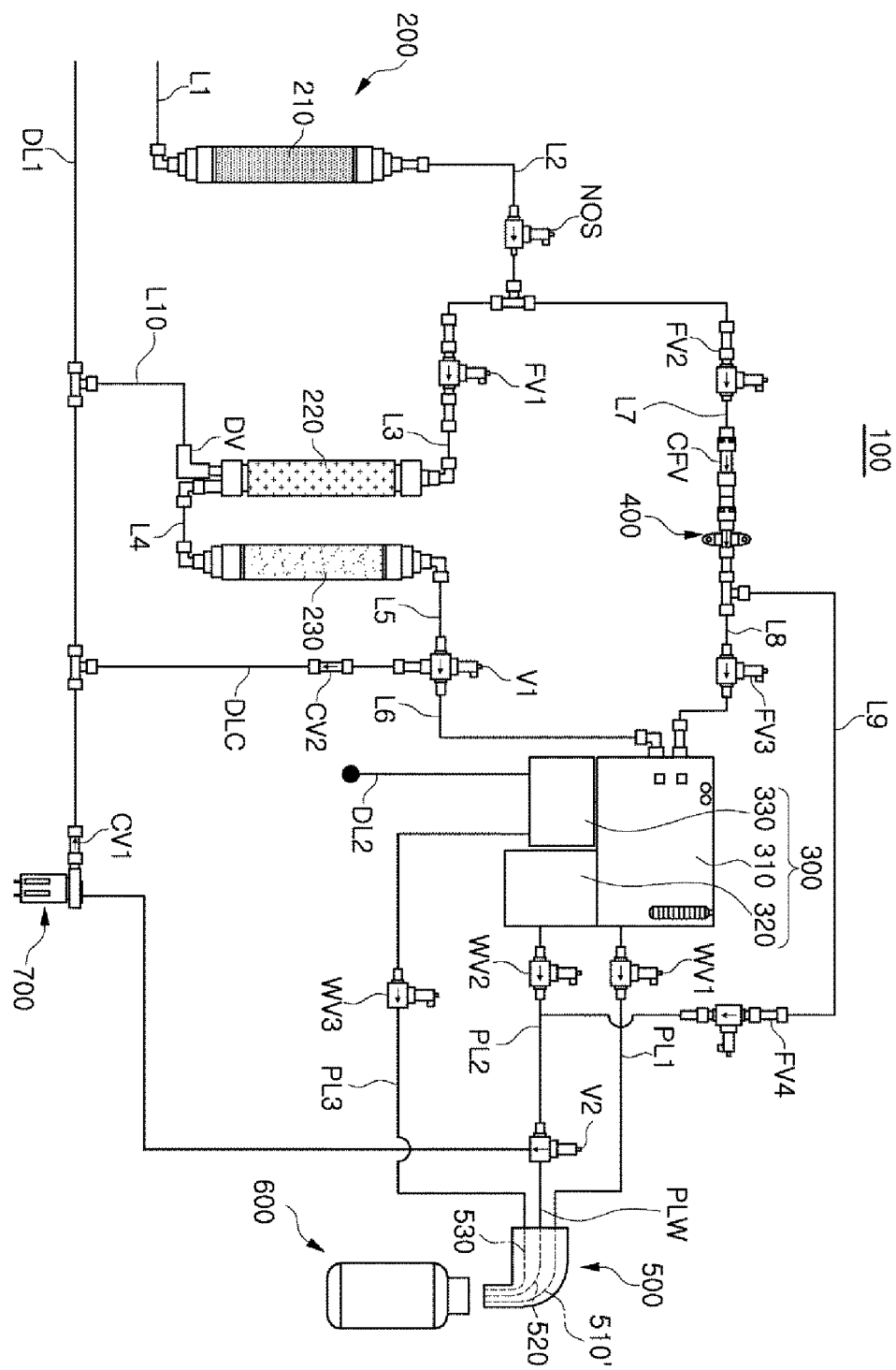

[Figure 12]
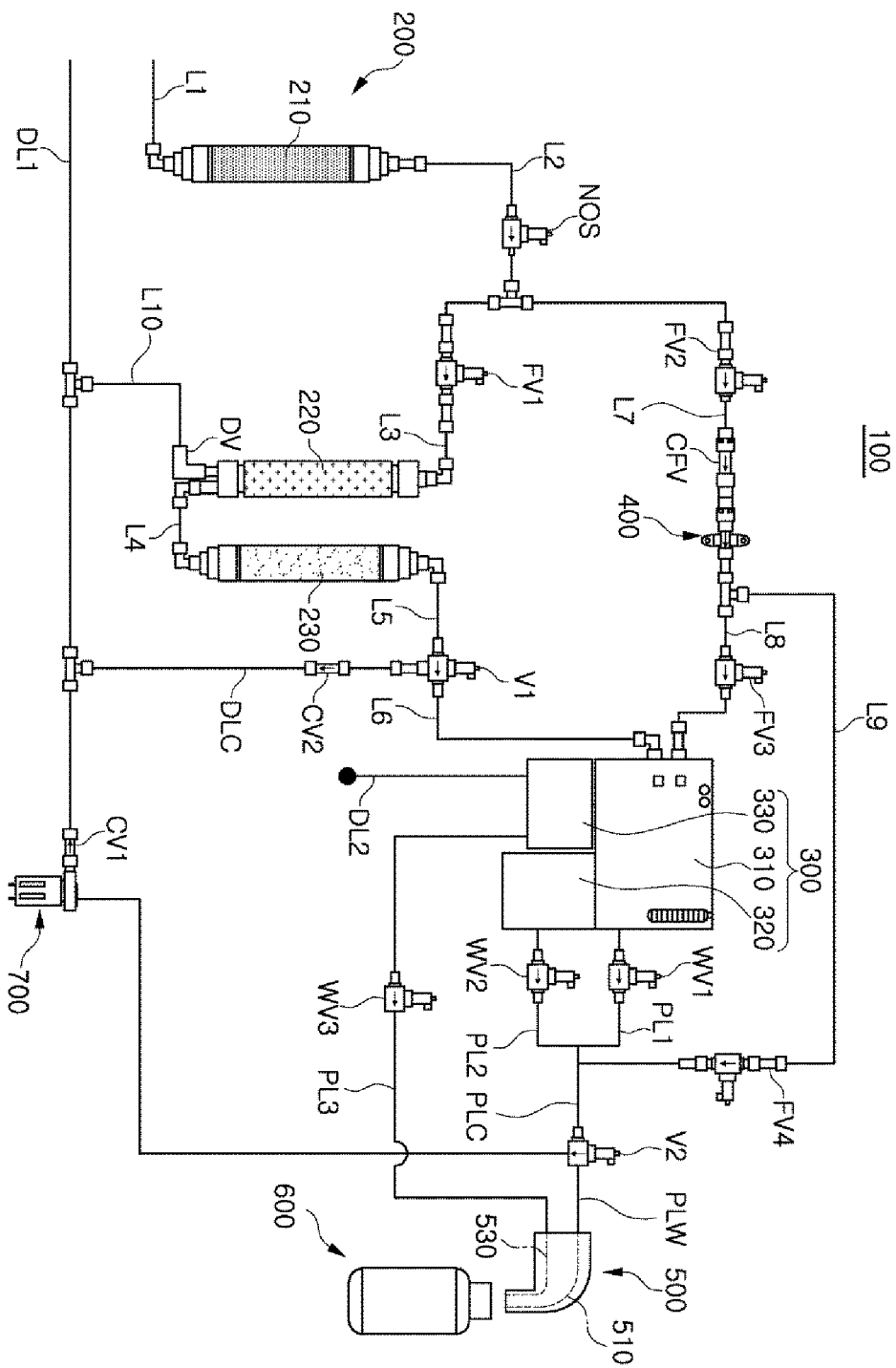

[Figure 13]
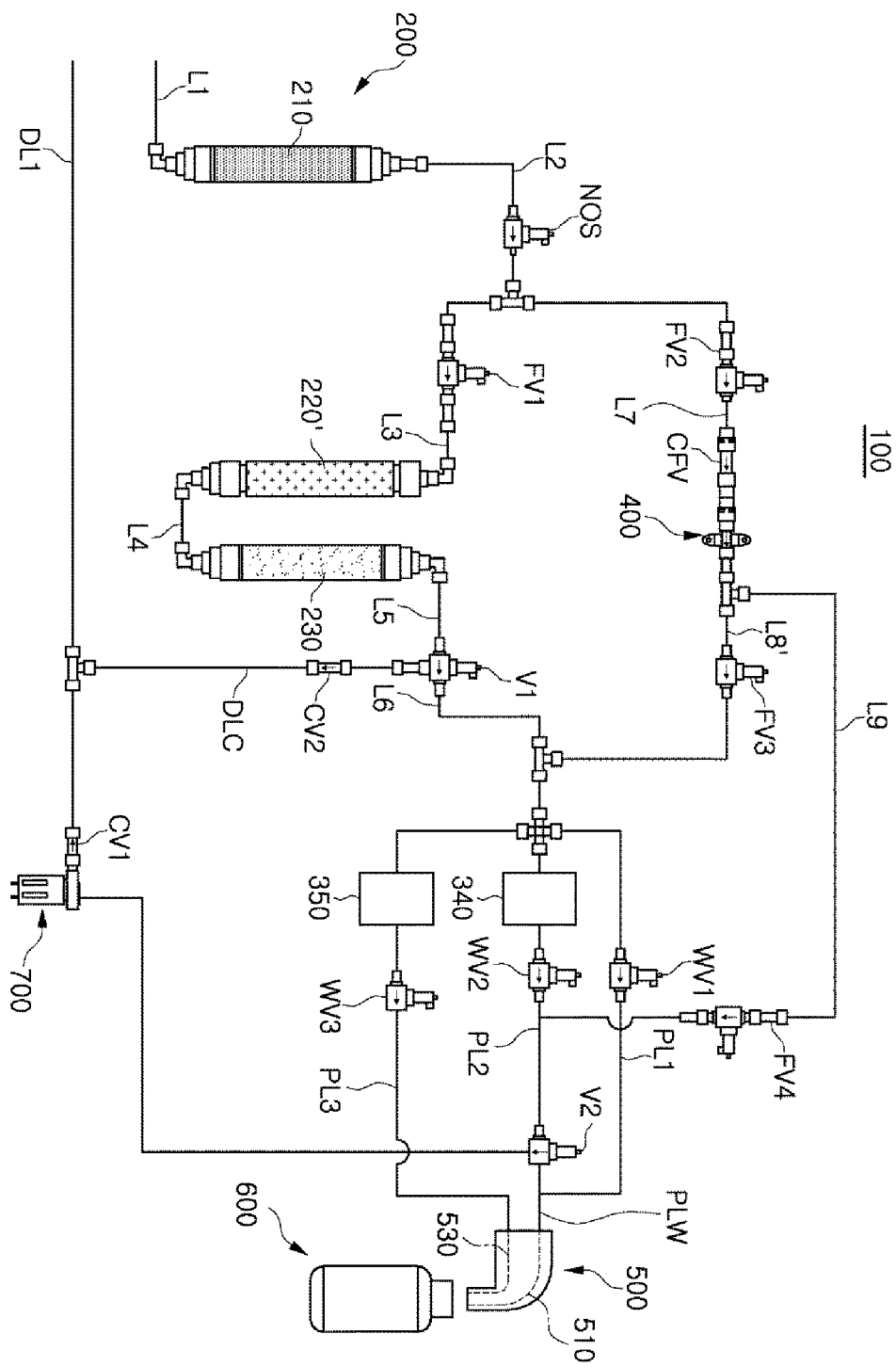

WATER TREATMENT APPARATUS

PRIORITY

This application is a National Phase Entry of International Application No. PCT/KR2016/007245, which was filed on Jul. 5, 2016, and claims priority to Korean Patent Application Nos. 10-2015-0100550 and 10-2015-0140839, which were filed on Jul. 15, 2015 and Oct. 7, 2015, respectively, the contents of each of which are incorporated herein by reference.

TECHNICAL FIELD

The present disclosure relates to a water treatment apparatus treating water and supplying treated water to a user.

BACKGROUND ART

Water treatment devices are devices treating water to be suitable for the usage thereof and supplying the treated water to users.

As such water treatment devices, there are provided water purifiers, filtering water with water filters and supplying the water to users, ionizers, electrolyzing water into alkaline water and acid water to supply the water to users, carbonated water producing devices mixing carbon dioxide with water to produce carbonated water and to supply the carbonated water to users, and the like.

Since water treatment devices treat water as described above, water, during treatment, or water, having been treated, is required to be prevented from being contaminated, such that water may be treated to be suitable for the usage thereof or sanitary water may be supplied to users.

Thus, it is required to sterilize the majority of parts of water treatment devices, including discharge members discharging treated water, flow lines through which water flows, as well as storage spaces in which treated water is stored, and the like.

DISCLOSURE

Technical Problem

The present disclosure is provided to address at least one requirement or problem occurring in the related art.

An aspect of the present disclosure is to provide a water treatment apparatus in which a discharge member discharging purified water, filtered by a filtering unit, externally, and at least a portion of a flow path connected to the discharge member, are sterilized using sterilizing water produced by a sterilizing water generator.

An aspect of the present disclosure is to provide a water treatment apparatus in which a storage unit storing purified water, filtered by a filtering unit, is sterilized, as well as a discharge member externally discharging the purified water, filtered by the filtering unit, and at least a portion of a flow path connected to the discharge member, using sterilizing water produced by a sterilizing water generator.

An aspect of the present disclosure is to provide a water treatment apparatus in which at least a portion of a flow path connected to a discharge member is sterilized at regular intervals.

An aspect of the present disclosure is to provide a water treatment apparatus, in which a discharge member and a flow path connected to the discharge member, sterilized with sterilizing water, are rinsed with purified water stored in a storage unit or purified water, filtered by a filtering unit.

An aspect of the present disclosure is to provide a water treatment apparatus, in which a storage unit, as well as a discharge member and a flow path connected to the discharge member, sterilized with sterilizing water, are rinsed with purified water, filtered by a filtering unit.

An aspect of the present disclosure is to provide a water treatment apparatus, in which a post-carbon filter included in a filtering unit is flushed with purified water filtered by a pretreatment filter and a membrane filter or a pretreatment filter and a direct-receiving filter, included in the filtering unit.

Technical Solution

A water treatment apparatus according to an aspect of the present disclosure provides the following characteristics.

According to an aspect of the present disclosure, a water treatment apparatus includes a filtering unit including a water filter filtering raw water; a sterilizing water generator producing sterilizing water from purified water filtered by at least a portion of the filtering unit; and a discharge member through which the purified water, filtered by the filtering unit, is discharged externally. The sterilizing water produced by the sterilizing water generator sterilizes the discharge member and at least a portion of a flow path connected to the discharge member.

The discharge member may be sterilized at a time required by a user, and the at least a portion of the flow path connected to the discharge member may be controlled to be sterilized once per predetermined first period.

The discharge member and the flow path connected to the discharge member, having been sterilized with the sterilizing water, may be rinsed with purified water stored in a storage unit, storing the purified water, filtered by the filtering unit, therein and connected to the discharge member, or with the purified water filtered by the filtering unit.

The sterilizing water produced by the sterilizing water generator may sterilize the storage unit.

The storage unit may be controlled to be sterilized once per predetermined second period.

The storage unit sterilized with the sterilizing water may be rinsed with the purified water filtered by the filtering unit.

The sterilizing water supplied by the sterilizing water generator and discharged through the discharge member may be contained in a drain container, and the discharge member may be immersed in the sterilizing water contained in the drain container, to be sterilized.

The sterilizing water generator may be connected to the discharge member by a discharge member sterilization line.

The sterilizing water generator may be connected to a storage unit, storing the purified water, filtered by the filtering unit, therein and connected to the discharge member, by a storage unit sterilization line, or the sterilizing water generator may be connected to the flow path connected to the discharge member to be connected to the filtering unit, by a main sterilization line.

The storage unit sterilization line or the main sterilization line, and the discharge member sterilization line may each be provided with a feed valve.

The storage unit may be connected to a discharge-side flow path switching valve, or the flow path connected to the discharge member to be connected to the filtering unit may be connected to the discharge-side flow path switching valve.

The discharge member sterilization line may be connected to a line connecting the storage unit and the discharge-side flow path switching valve to each other or to a line connecting the filtering unit and the main sterilization line to the discharge-side flow path switching valve.

The discharge-side flow path switching valve may be connected to the discharge member and a main drain line.

A purified water discharge line provided with a purified water discharge valve may be connected to a purified water tank included in the storage unit and storing the purified water, filtered by the filtering unit, or the purified water discharge line may be connected to the filtering unit and the main sterilization line.

A cold water discharge line provided with a cold water discharge valve may be connected to a cold water tank included in the storage unit and cooling purified water supplied by the purified water tank to produce cold water, or the cold water discharge line may be connected to the filtering unit and the main sterilization line.

When the cold water discharge line is connected to the filtering unit and the main sterilization line, the cold water discharge line may be provided with a cold water generator.

The discharge-side flow path switching valve may be connected to the discharge member by a first discharge connection line.

The cold water discharge line may be connected to the discharge-side flow path switching valve.

The discharge member sterilization line may be connected to the cold water discharge line.

The purified water discharge line may be connected to the first discharge connection line.

The purified water discharge line may be connected to the discharge member.

The purified water discharge line and the cold water discharge line may be connected to the discharge-side flow path switching valve by a second discharge connection line.

The discharge member sterilization line may be connected to the second discharge connection line.

A hot water discharge line provided with a hot water discharge valve may be connected to a hot water tank included in the storage unit and heating the purified water supplied from the purified water tank to produce hot water, or the hot water discharge line may be connected to the filtering unit and the main sterilization line.

When the hot water discharge line is connected to the filtering unit and the main sterilization line, the hot water discharge line may be provided with an instantaneous water heater.

The hot water discharge line may be connected to the discharge member.

The discharge member may be provided with a cold purified water discharge passage connected to a first discharge connection line connected to the discharge-side flow path switching valve, while being externally connected, and with a hot water discharge passage connected to the hot water discharge line while being externally connected.

The discharge member may be provided with a purified water discharge passage connected to the purified water discharge line while being externally connected, a cold water discharge passage connected to a first discharge connection line connected to the discharge-side flow path switching valve, while being externally connected, and a hot water discharge passage connected to the hot water discharge line while being externally connected.

The water filter may be provided as a plurality of water filters, and the sterilizing water generator may produce sterilizing water from purified water filtered by at least a portion of the plurality of water filters.

The plurality of water filters may include a pretreatment filter, a membrane filter, and a post-carbon filter.

The plurality of water filters may include a pretreatment filter, a direct-receiving filter, and a post-carbon filter.

The sterilizing water generator may produce sterilizing water from purified water filtered by the pretreatment filter.

The post-carbon filter may be flushed with purified water filtered by the pretreatment filter and the membrane filter, or the pretreatment filter and the direct-receiving filter, included in the filtering unit, and the purified water, having flushed the post-carbon filter, may be drained to the main drain line.

Advantageous Effects

As described above, in a water treatment apparatus in the present disclosure in the present disclosure, a discharge member through which purified water, filtered by a filtering unit, is externally discharged, and at least a portion of a flow path connected to the discharge member, may be sterilized using sterilizing water produced by a sterilizing water generator.

Further, in the present disclosure, a storage unit in which purified water, filtered by a filtering unit, is stored, may also be sterilized with sterilizing water produced by a sterilizing water generator.

In addition, in the present disclosure, at least a portion of a flow path connected to a discharge member may be sterilized every predetermined interval.

Furthermore, in the present disclosure, a discharge member and a flow path connected to the discharge member, sterilized with sterilizing water, may be rinsed with purified water stored in a storage unit or purified water, filtered by a filtering unit.

In the present disclosure, a storage unit may also be rinsed with purified water, filtered by a filtering unit.

Further, in the present disclosure, a post-carbon filter included in a filtering unit may be flushed with purified water filtered by a pretreatment filter and a membrane filter or a pretreatment filter and a direct-receiving filter, included in the filtering unit.

DESCRIPTION OF DRAWINGS

FIG. 1 is a view of a first embodiment of a water treatment apparatus in the present disclosure.

FIGS. 2 to 10 are views of operations of the water treatment apparatus in the first embodiment of the present disclosure, wherein FIG. 2 illustrates that purified water filtered by a filtering unit is stored in a storage unit and then externally discharged through a discharge member.

FIG. 3 is a view of flushing of a post-carbon filter included in a filtering unit.

FIG. 4 is a view of drainage of purified water stored in a storage unit.

FIG. 5 illustrates that a storage unit is sterilized with sterilizing water produced by a sterilizing water generator.

FIG. 6 is a view illustrating that a storage unit, having been sterilized with sterilizing water, is rinsed with purified water filtered by a filtering unit.

FIG. 7 is a view illustrating that a discharge member is sterilized with sterilizing water produced by a sterilizing water generator.

FIG. 8 is a view illustrating that a discharge member, having been sterilized with sterilizing water, is rinsed with purified water stored in a storage unit.

FIG. 9 is a view illustrating that a flow path connecting a storage unit and a discharge member is sterilized with sterilizing water produced by a sterilizing water generator.

FIG. 10 is a view illustrating that a flow path connecting a storage unit and a discharge member, having been sterilized with sterilizing water, is rinsed with purified water stored in a storage unit.

FIG. 11 is a view of a second embodiment of the water treatment apparatus in the present disclosure.

FIG. 12 is a view of a third embodiment of the water treatment apparatus in the present disclosure.

FIG. 13 is a view of a fourth embodiment of the water treatment apparatus in the present disclosure.

MODE FOR INVENTION

A water treatment apparatus in the present disclosure will be described below in detail to facilitate understanding of the features of the invention as described above.

The embodiments described below will be explained on the basis of embodiments suited to understand the technical characteristics of the present disclosure, and the technical features of the present disclosure are not limited by the embodiments described, and the present disclosure may be implemented with other embodiments. Therefore, it is intended that the present disclosure cover all modifications and variations of this invention, provided they fall within the scope of the appended claims and their equivalents. In order to facilitate understanding of the embodiments described below, in the reference numerals provided in the accompanying drawings, among the constituent elements performing the same function in respective embodiments, related constituent elements are indicated by the same or similar reference numerals.

First Embodiment of Water Treatment Apparatus

Hereinafter, a first embodiment of a water treatment apparatus 100 in the present disclosure in the present disclosure will be described with reference to FIGS. 1 to 10.

FIG. 1 is a view of a first embodiment of a water treatment apparatus in the present disclosure, and FIGS. 2 to 10 are views of operations of the water treatment apparatus in the first embodiment of the present disclosure.

The water treatment apparatus 100 according to the first embodiment in the present disclosure may include a filtering unit 200, a storage unit 300, a sterilizing water generator 400, and a discharge member 500.

Raw water may be filtered in the filtering unit 200.

To this end, the filtering unit 200 may be connected to a raw water supply source (not shown), such as a water supply, a raw water storage tank or the like, by a raw water supply line L1 as illustrated in FIG. 1. The filtering unit 200 may include a water filter filtering raw water.

The water filter included in the filtering unit 200 may be provided as a plurality of water filters. As the plurality of water filters, for example, a pretreatment filter 210, a membrane filter 220, and a post-carbon filter 230 may be employed as illustrated in FIG. 1.

However, the plurality of water filters are not particularly limited, and any water filter capable of filtering raw water may be used.

The pretreatment filter 210 may be a combination of a precipitation filter of the related art and a precarbon filter, but may also be configured separately. The configuration of the pretreatment filter 210 is not particularly limited, and any configuration capable of filtering raw water may be used.

The pretreatment filter 210 may be connected to the raw water supply line L1 described above. Thus, raw water of the raw water supply source, introduced to the filtering unit 200 via the raw water supply line L1, may first be filtered by the pretreatment filter 210 as illustrated in FIG. 2.

The membrane filter 220 may further filter purified water, having been filtered by the pretreatment filter 210. For example, relatively large foreign matter may be filtered by the pretreatment filter 210, and relatively small foreign matter may be filtered by the membrane filter 220.

To this end, the membrane filter 220 may be connected to the pretreatment filter 210 by purified water lines L2 and L3. In addition, a raw water shutoff valve NOS may be provided on the purified water line L2, and a feed valve FV1 may be provided on the purified water line L3. However, a position of the raw water shutoff valve NOS is not particularly limited, as long as an inflow of raw water may be blocked thereby.

Thus, as illustrated in FIG. 2, when the raw water shutoff valve NOS is opened, raw water of the raw water supply source may flow into the pretreatment filter 210 to be filtered. When the feed valve FV1 is opened, purified water filtered by the pretreatment filter 210 may be introduced to the membrane filter 220 to be filtered.

The membrane filter 220 may be, for example, a reverse osmosis membrane filter, in which a portion of incoming water is filtered and the remainder may not be filtered to be drained externally as domestic water.

In this case, the membrane filter 220 may be connected to a domestic water line L10 as illustrated in FIG. 1. The domestic water line L10 may be provided with a domestic water valve DV thereon, draining domestic water externally, while maintaining a predetermined pressure in the membrane filter 220. In addition, the domestic water line L10 may be connected to a main drain line DL1.

Thus, domestic water, not having been filtered by the membrane filter 220, may be introduced to the main drain line DL1 through the domestic water valve DV and the domestic water line L10 as illustrated in FIG. 2. The domestic water introduced to the main drain line DL1 may flow through the main drain line DL1 to be drained externally.

However, the membrane filter 220 is not limited to the above-described reverse osmosis membrane filter, and may be any water filter such as a UF (Ultrafiltration) membrane (hollow fiber membrane) filter or the like, as long as it may further filter purified water filtered by the pretreatment filter 210.

The post-carbon filter 230 may further filter purified water filtered by the membrane filter 220. For example, in the post-carbon filter 230, odor-causing substances, bacteria, and the like may be filtered.

To this end, the post-carbon filter 230 may be connected to the membrane filter 220 by a purified water line L4, such that the purified water filtered by the membrane filter 220 may be introduced and filtered by the post-carbon filter 230, as illustrated in FIG. 2.

On the other hand, if odor-inducing substances, bacteria or the like, are accumulated in the post-carbon filter 230 after filtering by the post-carbon filter 230 and an accumulation amount thereof reaches a predetermined amount or more, the odor-inducing substances, bacteria or the like may no longer be filtered.

In this case, purified water discharged from the post-carbon filter 230 flows into the storage unit 300 in which the filtered water, having been filtered by the filtering unit 200, is stored in a state in which the odor causing substances, bacteria or the like is contained, thereby causing the occurrence of odors or the proliferation of bacteria in the storage unit 300.

Further, bacteria accumulated in the post-carbon filter 230 may be propagated in the post-carbon filter 230.

Thus, the post-carbon filter 230 may be required to be periodically flushed to remove odor causing substances, bacteria or the like, accumulated in the post-carbon filter 230.

The post-carbon filter 230 may be flushed with purified water filtered by the pretreatment filter 210 and the membrane filter 220 as illustrated in FIG. 3.

To this end, the post-carbon filter 230 may be connected to a filtration-side flow path switching valve V1 by a purified water line L5. Further, the filtration-side flow path switching valve V1 may be connected to a main drain line DL1 by a drain connection line DLC.

Thus, as illustrated in FIG. 3, for example, when the raw water shutoff valve NOS and the feed valve FV1 are opened and the filtration-side flow path switching valve V1 is switched to the drain connection line DLC, the purified water filtered by the pretreatment filter 210 and the membrane filter 220 may be introduced to the post-carbon filter 230 to flush the post-carbon filter 230.

Then, the purified water, having flushed the post-carbon filter 230, may flow into the main drain line DL1 through the drain connection line DLC as illustrated in FIG. 3, and may flow through the main drain line DL1 to be drained externally.

As such, as the post-carbon filter 230 is flushed with the purified water filtered by the pretreatment filter 210 and the membrane filter 220, the post-carbon filter 230 may be flushed, with purified water filtered by the membrane filter 220 to have a relatively low-concentration of total-dissolved solids (TDS).

Thus, since the TDS concentration of the purified water remaining in the post-carbon filter 230 after the flushing is relatively low, the TDS concentration of the purified water, filtered by the filtering unit 200, and then stored in the storage unit 300 may be reduced at the time of repurification after flushing of the post-carbon filter 230.

Thus, purified water having a relatively low TDS concentration may be supplied to a user.

On the other hand, the drain connection line DLC may be provided with a check valve CV2 formed thereon, to allow flow from the drain connection line DLC to the main drain line DL1, but to prevent flow from the main drain line DL1 to the drain connection line DLC.

The storage unit 300 may store the purified water, filtered by the filtering unit 200. To this end, the storage unit 300 may be connected to the filtering unit 200 by a purified water connection line L6.

For example, as illustrated in FIG. 3, the purified water connection line L6 may be connected to the filtration-side flow path switching valve V1 described above, connected to the post-carbon filter 230 of the filtering unit 200, by the purified water line L5.

Further, for example, when the filtration-side flow path switching valve V1 is switched to the purified water connection line L6 instead of the drain connection flow path DLC as described above, the purified water filtered in the filtering unit 200 may be introduced to and stored in the storage unit 300 as illustrated in FIG. 2.

The storage unit 300 may include a purified water tank 310 and a cold water tank 320.

The purified water tank 310 may store purified water, filtered by the filtering unit 200. To this end, the purified water tank 310 may be connected to the above-mentioned purified water connection line L6. In addition, when the filtration-side flow path switching valve V1 is switched to the purified water connection line L6 as described above and illustrated in FIG. 2, the purified water, filtered by the filtering unit 200, may be introduced to the purified water tank 310 through the purified water connection line L6, to be stored therein.

The cold water tank 320 may cool the purified water supplied from the purified water tank 310 to produce cold water.

To this end, the purified water tank 310 and the cold water tank 320 may be integrally formed as a single tank, which may be divided into an upper portion, as the purified water tank 310, and a lower portion, as the cold water tank 320, by a separating member (not shown), in which a connection hole (not shown) is formed.

In this case, the purified water, having been introduced to the purified water tank 310, may be introduced to the cold water tank 320 through the connection hole of the separation member, to be stored therein.

On the other hand, the cold water tank 320 may also be formed separately from the purified water tank 310, and may be connected to the purified water tank 310 by a connection line (not shown) to receive purified water from the purified water tank 310.

The cold water tank 320 may be equipped with a cooling unit (not shown), such as an evaporator (not shown) through which a refrigerant flows or a thermoelectric module (not shown) through which heat is transferred from one-side to the other when power is supplied. Thus, the purified water flowing into the cold water tank 320 from the purified water tank 310, to be stored therein, may be cooled by the cooling unit to become cold water.

The purified water tank 310 may be connected to a purified water discharge line PL1 that is provided with a purified water discharge valve WV1 thereon. The cold water tank 320 may be connected to a cold water discharge line PL2 provided with a cold water discharge valve WV2.

Further, a discharge-side flow path switching valve V2 may be connected to the discharge member 500 by a first discharge connection line PLW. A cold water discharge line PL2 may be connected to the discharge-side flow path switching valve V2, and the purified water discharge line PL1 may be connected to the first discharge connection line PLW.

Thus, when the purified water discharge valve WV1 is opened, the purified water stored in the purified water tank 310 as illustrated in FIG. 2 may flow through the purified water discharge line PL1 and the first discharge connection line PLW, and then, may be externally discharged through the discharge member 500 to be supplied to a user.

When the cold water discharge valve WV2 is opened in a state in which the discharge-side flow path switching valve V2 is switched to the first discharge connection line PLW, the cold water stored in the cold water tank 320, as illustrated in FIG. 2, may flow through the cold water discharge line PL2 and the first discharge connection line PLW, and may be externally discharged through the discharge member 500 to be supplied to a user.

On the other hand, the storage unit 300 may further include a hot water tank 330.

The hot water tank 330 may heat the purified water supplied from the purified water tank 310 into hot water. To this end, the hot water tank 330 may be provided as a separate tank from the purified water tank 310, and may be connected to the purified water tank 310 by a connection line (not shown).

Further, any configuration of the hot water tank 330 may be used. For example, the hot water tank 330 may be integrally formed with the purified water tank 310 as a single tank in a manner similar to that of the foregoing cold water tank 320, which may be divided into an upper portion, as the purified water tank 310, and a lower portion, as the hot water tank 330, by a separating member, in which a connection hole is formed.

The hot water tank 330 may be provided with a heating unit (not shown), such as an electrothermal wire or the like.

Thus, the purified water introduced to the hot water tank 330 from the purified water tank 310, to be stored therein, may be heated by the heating unit to become hot water.

The hot water tank 330 may be connected to the discharge member 500 by a hot water discharge line PL3 provided with a hot water discharge valve WV3 thereon.

Thus, when the hot water discharge valve WV3 is opened, the hot water stored in the hot water tank 330 may flow through the hot water discharge line PL3, and may then be externally discharged through the discharge member 500 to be supplied to a user.

On the other hand, a hot water drain line DL2 may be connected to the hot water tank 330 to drain the hot water stored in the hot water tank 330 externally.

The sterilizing water generator 400 may produce sterilizing water from purified water having been filtered by at least a portion of the filtering unit 200. The sterilizing water generator 400 may generate sterilizing water from purified water filtered by at least a portion of a plurality of water filters when the filtering unit 200 includes the plurality of water filters as described above.

For example, as illustrated in FIG. 1, when the plurality of water filters included in the filtering unit 200 are the pretreatment filter 210, the membrane filter 220, and the post-carbon filter 230, the sterilizing water generator 400 may produce sterilizing water from the purified water filtered by the pretreatment filter 210.

To this end, the sterilizing water generator 400 may be connected to the purified water line L2 connected to the pretreatment filter 210 and provided with the raw water shutoff valve NOS thereon, by a sterilizing water producing line L7 provided with a feed valve FV2 thereon.

Further, when the feed valve FV2 is opened in a state in which the raw water shutoff valve NOS is opened, the purified water filtered by the pretreatment filter 210 may flow through the purified water line L2 and a sterilizing water generating line L7 to be introduced to the sterilizing water generator 400 as illustrated in FIG. 5.

In the sterilizing water generator 400, sterilizing water may be produced from purified water having been filtered by the pretreatment filter 210 and the membrane filter 220, and may also be produced from purified water having been filtered by the pretreatment filter 210, the membrane filter 220, and the post-carbon filter 230.

Further, in the sterilizing water generator 400, sterilizing water may be produced from purified water only filtered by the membrane filter 220 or only filtered by the post-carbon filter 230, and may also be produced from purified water filtered by the pretreatment filter 210 and the post-carbon filter 230, or the like. For example, the number and types of water filters of the filtering unit 200, by which raw water is filtered before flowing into the sterilizing water generator 400, are not particularly limited, and any number or types of water filters may be used.

The sterilizing water producing line L7 described above may be provided with a purified water flow-amount valve CFV thereon. Thus, a predetermined flow rate of purified water may be introduced to the sterilizing water generator 400.

The sterilizing water generator 400 may produce sterilizing water, for example, by electrolyzing water. A configuration in which sterilizing water is produced in the sterilizing water generator 400 is not particularly limited, and any configuration known in the art, in which the sterilizing water may be produced, may be used by adding a disinfectant to purified water having been introduced to the sterilizing water generator 400, or the like.

The discharge member 500, and at least a portion of a flow path connected to the discharge member 500, for example, at least a portion of a flow path connecting the storage unit 300 and the discharge member 500 to each other, may be sterilized using the sterilizing water produced by the sterilizing water generator 400.

The storage unit 300 may also be sterilized using the sterilizing water produced by the sterilizing water generator 400.

To this end, the sterilizing water generator 400 may be connected to the storage unit 300 and the discharge member 500 by a storage unit sterilization line L8 and a discharge member sterilization line L9, respectively. The storage unit sterilization line L8 and the discharge member sterilization line L9 may be provided with a feed valve FV3 and a feed valve FV4, respectively.

The discharge member sterilization line L9 may be connected to a line connecting the storage unit 300 and the discharge-side flow path switching valve V2 to each other, for example, connected to the cold water discharge line PL2 as illustrated in FIG. 1. The discharge-side flow path switching valve V2 may be connected to the main drain line DL1.

In the configuration, when the sterilizing water is produced in the sterilizing water generator 400 and the feed valve FV3 provided on the storage unit sterilization line L8 is opened, the sterilizing water produced in the sterilizing water generator 400 may be introduced to the storage unit 300, in detail, into the purified water tank 310 and the cold water tank 320 of the storage unit 300 as illustrated in FIG. 5, by the storage unit sterilization line L8, thereby sterilizing the purified water tank 310 and the cold water tank 320.

In addition, for example, after a predetermined period of time has elapsed, when the cold water discharge valve WV2 is opened and the discharge-side flow path switching valve V2 is switched to the main drain line DL1, the sterilizing water, having sterilized the purified water tank 310 and the cold water tank 320, may be introduced to the main drain line DL1 through the cold water discharge line PL2, as illustrated in FIG. 5.

Thus, the cold water discharge line PL2 may also be sterilized. The sterilizing water, having been introduced to the main drain line DL1, may flow through the main drain line DL1, and may then be drained externally.

The sterilization of the storage unit 300 by the sterilizing water, as described above, may be performed once per predetermined period, for example, one time in several days, for example, once every five days. However, a sterilization cycle of the storage unit 300 is not particularly limited.

On the other hand, as illustrated in FIG. 4, before the sterilization of the storage unit 300 by the sterilizing water, the purified water stored in the storage unit 300 may be partially drained or entirely drained.

For example, when the cold water discharge valve WV2 is opened and the discharge-side flow path switching valve V2 is switched to the main drain line DL1, the purified water and the cold water stored in the purified water tank 310 and the cold water tank 320 may be introduced to the main drain line DL1 through the cold water discharge line PL2 as illustrated in FIG. 4.

The purified water and the cold water introduced to the main drain line DL1 may flow through the main drain line DL1 to be drained externally.

In this configuration, when the sterilizing water is produced in the sterilizing water generator 400, the feed valve FV4, provided on the discharge member sterilization line L9, is opened, and the discharge-side flow path switching valve V2 is switched to the first discharge connection line PLW, the sterilizing water produced in the sterilizing water generator 400 may be introduced to the discharge member 500 through the discharge member sterilization line L9, the cold water discharge line PL2 and the first discharge connection line PLW, as illustrated in FIG. 7.

In this case, in a case in which a drain container 600 is disposed below the discharge member 500, the sterilizing water, having been introduced to the discharge member 500, may be discharged from the discharge member 500, to be contained in the drain container 600. Further, as illustrated in FIG. 7, the discharge member 500 may be immersed in the sterilizing water contained in the drain container 600, such that the discharge member 500 may be sterilized. A size and shape of the drain container 600 are not particularly limited, and any size or shape may be used as long as the drain container 600 may accommodate the discharge member 500.

The sterilization of the discharge member 500 by the sterilizing water may be performed at a time required by a user. However, the sterilization cycle of the discharge member 500 is not particularly limited.

When the discharge member 500 is sterilized as described above, the cold water discharge line PL2 and the first discharge connection line PLW may also be sterilized while the sterilizing water flows.

On the other hand, a flow path connecting the storage unit 300 and the discharge member 500 to each other, such as the cold water discharge line PL2 or the like, may be a portion requiring frequent sterilization, and thus, the sterilization thereof being performed at a predetermined cycle or a time required by a user, as described above, may not be sufficient.

For example, at least a portion of the flow path connecting the storage unit 300 and the discharge member 500, such as the cold water discharge line PL2 or the like, may be required to be sterilized after a relatively short predetermined period, for example, daily.

To this end, the feed valve FV4 provided on the discharge member sterilization line L9 may be opened in a state in which the sterilizing water has been produced in the sterilizing water generator 400, and the discharge-side flow path switching valve V2 may be switched to the main drain line DL1. Thus, as illustrated in FIG. 9, the sterilizing water produced by the sterilizing water generator 400 may be introduced to, for example, the cold water discharge line PL2 by the discharge member sterilization line L9.

The cold water discharge line PL2 may be sterilized while the sterilizing water flows through the cold water discharge line PL2. As such, the sterilizing water, having sterilized the cold water discharge line PL2, may flow into the main drain line DL1 through the discharge-side flow path switching valve V2, may flow through the main drain line DL1, and then, may be drained externally.

Thus, a flow path connecting the storage unit 300 and the discharge member 500, for example, the cold water discharge line PL2, may be sterilized daily.

As described above, the storage unit 300, the discharge member 500, and the flow path connecting the storage unit 300 and the discharge member 500 to each other, having been sterilized with the sterilizing water, may be rinsed with purified water stored in the storage unit 300 or purified water, filtered by the filtering unit 200.

For example, after the storage unit 300 is sterilized with the sterilizing water, the storage unit 300 may be rinsed with the purified water, filtered by the filtering unit 200, as illustrated in FIG. 6.

To this end, after the storage unit 300 is sterilized with sterilizing water, the raw water shutoff valve NOS, the feed valve FV1 and the cold water discharge valve WV2 may be opened, the filtration-side flow path switching valve V1 may be switched to the purified water connection line L6, and the discharge-side flow path switching valve V2 may be switched to the main drain line DL1.

Thus, as illustrated in FIG. 6, the purified water, filtered by the filtering unit 200, may flow into the storage tank 300, for example, into the purified water tank 310 and the cold water tank 320 of the storage unit 300, to rinse the purified water tank 310 and the cold water tank 320. The purified water, having rinsed the purified water tank 310 and the cold water tank 320, may rinse the cold water discharge line PL2 while flowing through the cold water discharge line PL2, and then, may be drained externally through the main drain line DL1.

After the discharge member 500 is sterilized, the discharge member 500 may be rinsed with purified water stored in the storage unit 300, as illustrated in FIG. 8.

To this end, after the discharge member 500 is sterilized, the cold water discharge valve WV2 may be opened, and the discharge-side flow path switching valve V2 may be switched to the first discharge connection line PLW.

Thus, cold water stored in the cold water tank 320 may flow into the discharge member 500 through the cold water discharge line PL2 and the first discharge connection line PLW.

The cold water having been introduced to the discharge member 500 may be discharged from the discharge member 500, and may then be introduced to the drain container 600 disposed below the discharge member 500, to be contained therein. Then, the discharge member 500 may be immersed in the cold water contained in the drain container 600.

Thus, the discharge member 500 may be rinsed with cold water.

In this case, as the purified water discharge valve WV1 is opened to allow the purified water of the purified water tank 310 to flow into the discharge member 500 through the purified water discharge line PL1 and the first discharge connection line PLW, the discharge member 500 may be rinsed with the purified water of the purified water tank 310.

In addition, the hot water discharge valve WV3 may be opened to allow hot water of the hot water tank 330 to flow into the discharge member 500 through the hot water discharge line PL3, and thus, the discharge member 500 may be rinsed with the hot water of the hot water tank 330.

After the cold water discharge line PL2 is sterilized, the cold water discharge line PL2 may be rinsed with the purified water stored in the storage unit 300 as illustrated in FIG. 10.

To this end, after the cold water discharge line PL2 is sterilized, the cold water discharge valve WV2 may be opened, and the discharge-side flow path switching valve V2 may be switched to the main drain line DL1.

Thus, the cold water stored in the cold water tank 320 may flow into the cold water discharge line PL2 to rinse the cold water discharge line PL2.

The cold water, having rinsed the cold water discharge line PL2, may be introduced to the main drain line DL1 to flow through the main drain line DL1 and then be drained externally.

The main drain line DL1 may be provided with a drain pump 700, such that drainage may be smoothly performed through the main drain line DL1. Further, the main drain line DL1 may be provided with a check valve CV1, to prevent the occurrence of backflow when drainage is performed through the main drain line DL1.

In the case of the discharge member 500, the purified water, filtered by the filtering unit 200, for example, the purified water stored in the storage unit 300, may be externally discharged through the discharge member 500. To this end, the discharge member 500 may be provided with a cold purified water discharge passage 510 connected to the first discharge connection line PLW and externally connected, and a hot water discharge passage 530 connected to the hot water discharge line PL3 and externally connected.

Purified water or cold water may be externally discharged through the cold purified water discharge passage 510, to be supplied to a user. In addition, hot water may be externally discharged through the hot water discharge passage 530 to be supplied to a user.

Second Embodiment of Water Treatment Apparatus

Hereinafter, a second embodiment of the water treatment apparatus in the present disclosure will be described with reference to FIG. 11.

FIG. 11 is a view of a second embodiment of the water treatment apparatus in the present disclosure.

The second embodiment of the water treatment apparatus differs from the first embodiment of the water treatment apparatus described above with reference to FIGS. 1 to 10, in that a purified water discharge line PL1 is not connected to a first discharge connection line PLW, but is directly connected to a discharge member 500.

Thus, configurations different from those of the first embodiment will be mainly described below, and descriptions of remaining configurations may be replaced with descriptions provided above with reference to FIGS. 1 to 10.

As illustrated in FIG. 11, in the second embodiment of the water treatment apparatus in the present disclosure, the purified water discharge line PL1 may be directly connected to the discharge member 500.

In this case, the discharge member 500 may be provided with a purified water discharge passage 510' connected to the purified water discharge line PL1 while being externally connected, a cold water discharge passage 520 connected to the first discharge connection line PLW while being externally connected, and a hot water discharge passage 530 connected to a hot water discharge line PL3 while being externally connected.

Purified water may be externally discharged through the purified water discharge passage 510' and may be supplied to a user. In addition, cold water may be externally discharged through the cold water discharge passage 520 to be supplied to the user. Hot water may be externally discharged through the hot water discharge passage 530 to be supplied to the user.

Third Embodiment of Water Treatment Apparatus

Hereinafter, a third embodiment of the water treatment apparatus in the present disclosure will be described with reference to FIG. 12.

FIG. 12 is a view of a third embodiment of the water treatment apparatus in the present disclosure.

In this case, the third embodiment of the water treatment apparatus is different from the first embodiment of the water treatment apparatus described above with reference to FIGS. 1 to 10, in that a purified water discharge line PL1 and a cold water discharge line PL2 are connected to a discharge-side flow path switching valve V2 by a second discharge connection line PLC, and a discharge member sterilization line L9 is connected to the second discharge connection line PLC.

Thus, configurations different from those of the first embodiment will be mainly described below, and descriptions of remaining configurations may be replaced with descriptions provided above with reference to FIGS. 1 to 10.

In the third embodiment of the water treatment apparatus, the purified water discharge line PL1 and the cold water discharge line PL2 may be connected to the discharge-side flow path switching valve V2 by the second discharge connection line PLC as illustrated in FIG. 12. Further, the discharge member sterilization line L9 may be connected to the second discharge connection line PLC.

Thus, at the time of performing discharge of water of a storage unit 300, or sterilizing or rinsing the storage unit 300, purified water stored in a purified water tank 310, sterilization water having sterilized the purified water tank 310, or purified water having rinsed the purified water tank 310, may be discharged through the purified water discharge line PL1.

In addition, a discharge member 500, having been sterilized with sterilizing water, may be rinsed with the purified water stored in the purified water tank 310. A flow path connecting the storage unit 300 and the discharge member 500 to each other, for example, the second discharge connection line PLC, may be sterilized with sterilizing water, and then, may be rinsed using the purified water stored in the purified water tank 310.

Fourth Embodiment of Water Treatment Apparatus

Hereinafter, a fourth embodiment of the water treatment apparatus in the present disclosure will be described with reference to FIG. 13.

FIG. 13 is a view of a fourth embodiment of the water treatment apparatus in the present disclosure.

In this case, the fourth embodiment of the water treatment apparatus is different from the first embodiment of the water treatment apparatus described above with reference to FIGS. 1 to 10, in that the storage unit 300 is not included, and a plurality of water filters included in a filtering unit 200 include a pretreatment filter 210, a direct-receiving filter 220', and a post-carbon filter 230.

Thus, configurations different from those of the first embodiment will be mainly described below, and descriptions of remaining configurations may be replaced with descriptions provided above with reference to FIGS. 1 to 10.

As illustrated in FIG. 13, the fourth embodiment of the water treatment apparatus 100 in the present disclosure may not include the storage unit 300.

For example, in the fourth embodiment of the water treatment apparatus 100, the water treatment apparatus may be a direct-receiving type water treatment apparatus in which purified water, having been filtered by the filtering unit 200, is externally discharged through a discharge member 500, without storing the purified water in the storage unit 300.

The filtering unit 200 of the fourth embodiment of the water treatment apparatus 100 may include a direct-receiving filter 220' instead of the membrane filter 220, for example, may include a nanotrap filter in which foreign substances contained in water may be filtered by static electricity, as well as filtration through pores, an ultrafiltration (UF) membrane (hollow fiber membrane) filter, or the like.

The fourth embodiment of the water treatment apparatus 100 in the present disclosure may not include the storage unit 300 described above in the foregoing embodiments.

Thus, a sterilizing water generator 400 may be connected to a flow path connected to the discharge member 500 to be connected to the filtering unit 200, rather than be connected to the storage unit 300. For example, the sterilizing water generator 400 may be connected to a purified water connection line L6 connected to a purified water line L5 that is connected to the post-carbon filter 230, by a main sterilization line L8'. The main sterilization line L8' may be provided with a feed valve FV3, in a manner similar to the storage sterilization line L8 described above in the foregoing embodiment.

In addition, a flow path connected to the discharge member 500 to be connected to the filtering unit 200, rather than to be connected to the storage unit 300, may be connected to a discharge-side flow path switching valve V2. For example, a cold water discharge line PL2 provided with a cold water discharge valve WV2 to be described later and connected to the filtering unit 200 and the main sterilization line L8' may be connected to a discharge-side flow path switching valve V2.

A discharge member sterilization line L9 may be connected to a line connecting the filtering unit 200 and the main sterilization line L8' to the discharge-side flow path switching valve V2, not the line connecting the storage unit 300 and the discharge-side flow path switching valve V2. For example, the discharge member sterilization line L9 may be connected to the above-described cold water discharge line PL2.

In addition, a purified water discharge line PL1 provided with a purified water discharge valve WV1 may be connected to the filtering unit 200, rather than the purified water tank 310. For example, the purified water discharge line PL1 may be connected to the purified water connection line L6 connected to the purified water line L5 that is connected to the post-carbon filter 230 of the filtering unit 200, and the purified water discharge line PL1 may be connected to the main sterilization line L8'.

The cold water discharge line PL2 provided with the cold water discharge valve WV2 may be connected to the filtering unit 200, rather than the cold water tank 320. For example, the cold water discharge line PL2 may be connected to the purified water connection line L6 connected to the purified water line L5 that is connected to the post-carbon filter 230 of the filtering unit 200, and the cold water discharge line PL2 may be connected to the main sterilization line L8'.

In this case, a cold water generator 340 may be provided on the cold water discharge line PL2. A configuration of the cold water generator 340 is not particularly limited, and any configuration known in the art may be employed as long as a cold water generator may cool purified water filtered and supplied by the filtering unit 200 to produce cold water.

Further, a hot water discharge line PL3 provided with a hot water discharge valve WV3 may also be connected to the filtering unit 200, rather than the hot water tank 330. For example, the hot water discharge line PL3 may be connected to the purified water connection line L6 connected to the purified water line L5 that is connected to the post-carbon filter 230 of the filtering unit 200, and the hot water discharge line PL3 may be connected to the main sterilization line L8'.

In this case, the hot water discharge line PL3 may be provided with an instantaneous water heater 350. A configuration of the instantaneous water heater 350 is not particularly limited, and any configuration known in the art may be employed as long as an instantaneous water heater may heat purified water filtered and supplied by the filtering unit 200 to produce hot water.

With this configuration, the purified water, filtered by the filtering unit 200, may be externally discharged through the purified water discharge line PL1 and the discharge member 500, and may be supplied to a user.

The purified water, filtered by the filtering unit 200, may be cooled to be cold water by the cold water generator 340 of the cold water discharge line PL2, to be externally discharged through the cold water discharge line PL2 and the discharge member 500, and then, be supplied to a user.

The purified water, filtered by the filtering unit 200, may be heated by the instantaneous water heater 350 of the hot water discharge line PL3, to become hot water, and may be externally discharged through the hot water discharge line PL3 and the discharge member 500 to be supplied to a user.

In addition, sterilizing water produced in the sterilizing water generator 400 may flow through the purified water discharge line PL1, or the cold water discharge line PL2 and the cold water generator 340, or the hot water discharge line PL3 and the instantaneous water heater 350, via the main sterilization line L8', to perform sterilization thereof, and may be drained externally through the main drain line DL1.

The purified water discharge line PL1, or the cold water discharge line PL2 and the cold water generator 340, or the hot water discharge line PL3 and the instantaneous water heater 350, are sterilized, and then, may be rinsed with purified water, filtered by the filtering unit 200, to be drained externally through the main drain line DL1.

The sterilizing water produced by the sterilizing water generator 400 may be supplied to the discharge member 500 through the discharge member sterilization line L9, and may be discharged to be contained in a drain container 600 to sterilize the discharge member 500.

After the sterilization of the discharge member 500 as described above, the purified water, filtered by the filtering unit 200, may rinse the discharge member 500 and may then be contained in the drain container 600.

In the fourth embodiment of the water treatment apparatus 100 in the present disclosure, the connection relationship among the discharge member sterilization line L9, the purified water discharge line PL1, the cold water discharge line PL2, the hot water discharge line PL3, the discharge-side flow path switching valve V2, and the discharge member 500, as well as the configuration of the discharge member 500, are not limited to those illustrated in FIG. 13, and thus, may be modified to those illustrated in the second embodiment and the third embodiment of the water treatment apparatus 100 of FIGS. 11 and 12.

The post-carbon filter 230 may be flushed with the purified water filtered by the pretreatment filter 210 and the direct-receiving filter 220' of the filtering unit 200, and may be drained to the main drain line DL1.

As described above, a water treatment apparatus according to an exemplary embodiment in the present disclosure may be provided. Thus, a discharge member, through which purified water, filtered by a filtering unit, is discharged externally, and at least a portion of a flow path connected to the discharge member, may be sterilized with sterilizing water produced by a sterilizing water generator. A storage unit in which the purified water, filtered by the filtering unit, is stored may also be sterilized with the sterilizing water produced by the sterilizing water generator. At least a portion of a flow path connected to the discharge member may be sterilized during every period. The discharge member and the flow path connected to the discharge member, having been sterilized with the sterilizing water, may be rinsed with the purified water stored in the storage unit or the purified water filtered by the filtering unit, and the storage unit may also be rinsed with the purified water filtered by the filtering unit. In addition, a post-carbon filter included in the filtering unit may be flushed with purified water filtered by a pretreatment filter and a membrane filter or a pretreatment filter and a direct-receiving filter, included in the filtering unit.

In the case of a water treatment apparatus according to exemplary embodiments as described above, the configurations of the embodiments described above may be applied without particular limits, and thus, the embodiments may be variously modified by selectively combining all or portions of the embodiments.

The invention claimed is:

1. A water treatment apparatus comprising:
   a filtering unit including a water filter filtering raw water;
   a sterilizing water generator producing sterilizing water from purified water filtered by at least a portion of the filtering unit; and
   a discharge member through which the purified water, filtered by the filtering unit, is discharged externally,
   wherein the sterilizing water produced by the sterilizing water generator sterilizes the discharge member and at least a portion of a flow path connected to the discharge member,
   the sterilizing water generator is connected to a storage unit, storing the purified water, filtered by the filtering unit, therein and connected to the discharge member, by a storage unit sterilization line, and the sterilizing water generator is connected to the flow path connected to a discharge member sterilization line bypassing the storage unit sterilization line, and
   the storage unit is connected to a discharge-side flow path switching valve.

2. The water treatment apparatus of claim 1, wherein the discharge member sterilization line bypassing the storage unit sterilization line is provided with a feed valve.

3. The water treatment apparatus of claim 1, wherein the discharge member sterilization line is connected to a line connecting the storage unit and the discharge-side flow path switching valve to each other.

4. The water treatment apparatus of claim 3, wherein the discharge-side flow path switching valve is connected to the discharge member and a main drain line.

5. The water treatment apparatus of claim 4, wherein a purified water discharge line provided with a purified water discharge valve is connected to a purified water tank included in the storage unit and storing the purified water, filtered by the filtering unit.

6. The water treatment apparatus of claim 5, wherein a cold water discharge line provided with a cold water discharge valve is connected to a cold water tank included in the storage unit and cooling purified water supplied by the purified water tank to produce cold water.

7. The water treatment apparatus of claim 6, wherein the discharge-side flow path switching valve is connected to the discharge member by a first discharge connection line.

8. The water treatment apparatus of claim 7, wherein the cold water discharge line is connected to the discharge-side flow path switching valve.

9. The water treatment apparatus of claim 8, wherein the purified water discharge line is connected to the first discharge connection line.

10. The water treatment apparatus of claim 8, wherein the purified water discharge line is connected to the discharge member.

11. The water treatment apparatus of claim 7, wherein the purified water discharge line and the cold water discharge line are connected to the discharge-side flow path switching valve by a second discharge connection line.

12. The water treatment apparatus of claim 11, wherein the discharge member sterilization line is connected to the second discharge connection line.

13. The water treatment apparatus of claim 6, wherein the discharge member sterilization line is connected to the cold water discharge line.

14. The water treatment apparatus of claim 6, wherein a hot water discharge line provided with a hot water discharge valve is connected to a hot water tank included in the storage unit and heating the purified water supplied from the purified water tank to produce hot water.

15. A water treatment apparatus comprising:
    a filtering unit including a water filter filtering raw water;
    a sterilizing water generator producing sterilizing water from purified water filtered by at least a portion of the filtering unit; and
    a discharge member through which the purified water, filtered by the filtering unit, is discharged externally,
    wherein the sterilizing water produced by the sterilizing water generator sterilizes the discharge member and at least a portion of a flow path connected to the discharge member,
    the sterilizing water generator is connected to the flow path connected to the discharge member to be connected to the filtering unit, by a main sterilization line and the sterilizing water generator is connected to the discharge member by a discharge member sterilization line bypassing the main sterilization line, and
    the flow path connected to the discharge member to be connected to the filtering unit is connected to the discharge-side flow path switching valve.

16. The water treatment apparatus of claim 15, wherein the discharge member sterilization line bypassing the main sterilization line is provided with a feed valve.

17. The water treatment apparatus of claim 15, wherein the discharge member sterilization line is connected to a line connecting the filtering unit and the main sterilization line to the discharge-side flow path switching valve.

18. The water treatment apparatus of claim 17, wherein the discharge-side flow path switching valve is connected to the discharge member and a main drain line.

19. The water treatment apparatus of claim 18, wherein a purified water discharge line provided with a purified water discharge valve is connected to the filtering unit and the main sterilization line.

20. The water treatment apparatus of claim 19, wherein a cold water discharge line provided with a cold water discharge valve is connected to the filtering unit and the main sterilization line.

21. The water treatment apparatus of claim 20, wherein the cold water discharge line is provided with a cold water generator.

22. The water treatment apparatus of claim 20, wherein the discharge-side flow path switching valve is connected to the discharge member by a first discharge connection line.

23. The water treatment apparatus of claim 22, wherein the cold water discharge line is connected to the discharge-side flow path switching valve.

24. The water treatment apparatus of claim 23, wherein the purified water discharge line is connected to the first discharge connection line.

25. The water treatment apparatus of claim 23, wherein the purified water discharge line is connected to the discharge member.

26. The water treatment apparatus of claim 22, wherein the purified water discharge line and the cold water discharge line are connected to the discharge-side flow path switching valve by a second discharge connection line.

27. The water treatment apparatus of claim 26, wherein the discharge member sterilization line is connected to the second discharge connection line.

28. The water treatment apparatus of claim 20, wherein the discharge member sterilization line is connected to the cold water discharge line.

29. The water treatment apparatus of claim 20, wherein a hot water discharge line provided with a hot water discharge valve is connected to the filtering unit and the main sterilization line.

30. The water treatment apparatus of claim 29, wherein the hot water discharge line is provided with an instantaneous water heater.

31. The water treatment apparatus of claim 29, wherein the hot water discharge line is connected to the discharge member.

* * * * *